United States Patent [19]

Obara

[11] Patent Number: 4,673,793

[45] Date of Patent: Jun. 16, 1987

[54] CONNECTING METAL FITTINGS FOR RESISTANCE WELDER

[75] Inventor: Hiroshi Obara, Tokyo, Japan

[73] Assignee: Obara Corporation, Tokyo, Japan

[21] Appl. No.: 796,471

[22] Filed: Nov. 8, 1985

[30] Foreign Application Priority Data

Jul. 12, 1985 [JP] Japan .................. 60-105544[U]

[51] Int. Cl.⁴ ............................................. B23K 11/00
[52] U.S. Cl. ................................... 219/86.1; 219/89
[58] Field of Search ............... 219/86.1, 86.21, 86.25, 219/86.31, 86.33, 86.8, 89, 116

[56] References Cited

U.S. PATENT DOCUMENTS 4,551,903 11/1985 Bisiach ........................... 219/86.8

FOREIGN PATENT DOCUMENTS 59-104278 6/1984 Japan .............................. 219/86.8
59-120083 8/1984 Japan .

Primary Examiner—Clifford C. Shaw
Attorney, Agent, or Firm—Flynn, Thiel, Boutell & Tanis

[57] ABSTRACT

Connecting metal fittings for resistance welder comprise receiver metal fittings connected to transformer side and clamping metal fittings connected to a resistance welding gun side. The receiver metal fittings include terminal strips and power supply connecting plates, both provided on the transformer side and fixed thereon, and a pair of rotatable clamping handles having stopping cylinders and stopping pins both provided on a handle lever. The second metal fittings include a shaft lever penetrating the terminal strips on the welding gun side and being inserted into notched grooves formed in tips of the power supply connecting plates, spring sockets being slidably inserted into both ends of the shaft lever, plate springs disposed between the spring sockets and power supply connecting plates, and a cam having stopping levers composed of stopping hooks formed on the tips thereof, and fixed thereon and adapted to make contact with the spring sockets. Clamping between both the metal fittings and clamping between the terminal plates and the power supply connecting plates can be simultaneously accomplished by the pair of handles.

2 Claims, 6 Drawing Figures

CONNECTING METAL FITTINGS FOR RESISTANCE WELDER

BACKGROUND OF THE INVENTION

1. Field of the Invention

The present invention relates to metal fittings for connecting between a transformer side and a welding gun side used for a resistance welder.

2. Description of the Prior Art

For connecting a welding gun to a transformer side, it is usually required not only to connect their terminals to each other but also to connect a cooling water line to an air supply line.

For example, Japanese Utility Model Laid-Open Publication No. 59-120083 discloses prior connecting metal fittings employing receiver metal fittings and clamping metal fittings. This type of connecting metal fittings will be described below with reference to FIGS. 5, 6.

Designated at 1 is receiver metal fittings including a pair of power supply connecting strips 4, 4 connected to terminal plates 3, 3 on the transformer side, a pair of first cooling water lines 5, 5 connected to a supply side water supply circulating line and a pair of first air supply lines connected to a supply side air supply circulating line. A rotatable first clamping handle 20 having a recessed part 19 for fitting provided in a handle shaft lever is mounted on the receiver metal fittings 1. Clamping metal fittings 2 include a clamping screw lever 21 penetrating terminal strips 10, 10 on the welding gun side and respective notched grooves 31 of the power supply connecting plates for clamping the plates on the terminal strips, a pair of first air supply lines 17, 17 connected to a welding gun side water supply circulating line, a pair of second air supply lines 18, 18 connected to a welding gun side air supply circulating line, and a pair of fitting projection pieces 22, 22 fitting in the fitting recessed parts 19, 19. A second clamping handle 23 mounted on the clamping screw lever 21 is provided on the clamping metal fittings 2. The clamping screw lever 21 includes opposing right and left screws 24a, 24b formed therein as well as the fitting projection pieces 22, 22 include opposing right and left screws 25a, 25b having the opposing screws 24a, 24b threaded therein.

For connecting the welding gun side with the transformer side, the receiver metal fittings 1 and the clamping metal fittings 2 are brought into close vicinity to each other, and with the first clamping handle 20 rotated, the engagement recessed parts 19, 19 are forced to engage with the engagement projection pieces 22, 22, and thereby both the metal fittings 1, 2 are closely connected with each other. In succession, with the second clamping handle 23 rotated the terminal plates 10, 10 are clamped by means of the power supply connecting strips 4, 4 to accomplish the connection therebetween.

Both the metal fittings 1, 2 may be detached by operating the respective clamping handles in reverse.

However, such prior clamping metal fittings suffer from some drawbacks: First and second two handles must be operated as a clamping handle for connecting both the metal fittings with each other. Namely, after operation of the first handle, the second one must be operated in succession, thus resulting in troublesome operation. In addition, there may be a case where only the first handle is operated and operation of the second one is forgotten. In such a case, since the terminal plate 10 and the power supply connecting strip 4 are not closely clamped, operation of a welder not only causes insufficient current to be supplied to a welding gun, but also produces a considerable amount of heat therebetween, thereby causing the possibility of damaging the connecting metal fittings.

SUMMARY OF THE INVENTION

In view of the drawbacks with the prior connecting metal fittings, it is an object of the present invention to provide connecting metal fittings for resistance welder in which simultaneous clamping not only for between both the metal fittings but also for between the terminal strip and the power supply connecting plate can be effected simply by operating a pair of handles.

Describing the arrangement of the metal fittings according to the present invention with reference to FIGS. 1 to 3, it includes receiver metal fittings 1 connected to a transformer side and clamping metal fittings 2 connected to a resistance welding gun side. The receiver metal fittings 1 include terminal plates 3, 3 on the transformer side and power supply connecting strips 4, 4 both fixed thereon, while including a pair of rotatable clamping handles 9, 9 each having stopping cylinders 7, 7 and stopping pins 8, 8 thereon provided on handle levers. The clamping metal fittings 2 include a shaft lever 11 inserted into notched grooves 31, 31 adapted to penetrate terminal plates 10, 10 on the welding gun side and formed on the tips of the power supply connecting strips 4, 4, spring sockets 12, 12 each slidably fitted to both ends of the shaft lever, plate springs 13, 13 each disposed between the spring socket and the power supply connecting plate, and a cam adapted to include stopping levers 16, 16 fixed thereon and to make contact with the spring sockets 12, 12, the stopping levers having stopping hooks 15, 15 formed on the tips thereof.

For connecting the welding gun side with the transformer side, the receiver metal fittings 1 and the clamping metal fittings 2 are made to approach to each other and both the clamping handles 9, 9 are respectively simultaneously and inwardly rotated, whereby the stopping pins 8, 8 enter the stopping hooks 15, 15, and then the stopping pins 8, 8 receive the clamping metal fittings 2 equipped with the cam shafts 14, 14 via the stopping hooks 15, 15 to push the fittings 2 to the metal fittings 1 before the stopping cylinders 7, 7 reach the side surface of the clamping metal fittings 2 by successively rotating the handles, thus allowing the clamping metal fittings 2 and the receiver metal fittings 1 to be closely connected with each other. Simultaneously, the cam is also rotated by rotating the handles 9, 9, whereby the power supply connecting strips 4, 4 push the terminal plates 10, 10 on the welding gun side, thus allowing the terminal plates 10, 10 to be clamped to the power supply connecting strips 4, 4.

Both the metal fittings 1, 2 may be disconnected by outwardly rotating the handles 9, 9 at the same time. Namely, the press force of the clamping metal fittings 2 to the receiver metal fittings 1 due to the stopping pins 8, 8 is removed by outwardly rotating both the handles, while press force to the power supply connecting plates 1, 4 due to the plate springs 13, 13 is also removed by rotating the cam, thus enabling the metal fittings 1, 2 to be easily separated.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An embodiment of connecting metal fittings for resistance welder according to the present invention will described below with reference to FIGS. 1 to 4.

Figure 1:
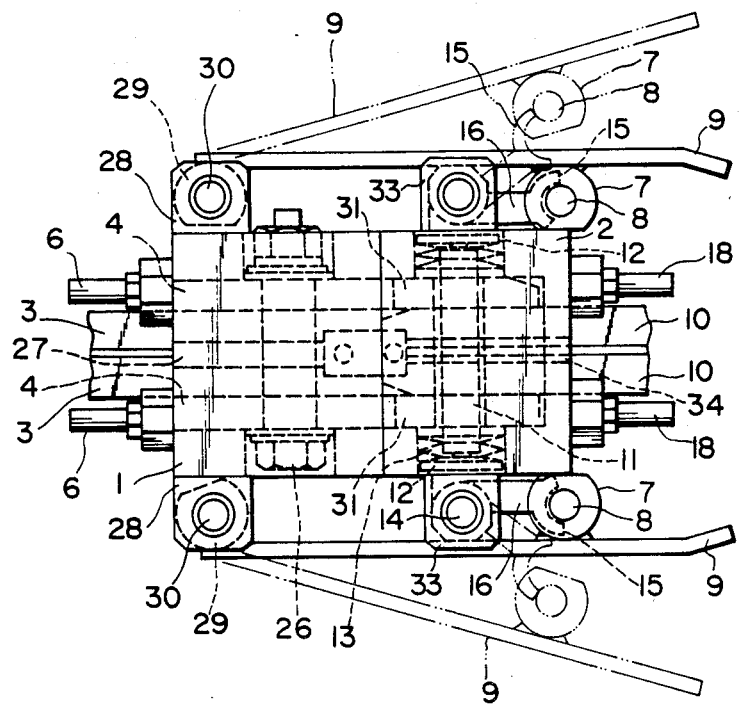
FIG. 1 is a plan view illustrating an embodiment of connecting metal fittings according to the present invention.
Figure 2:
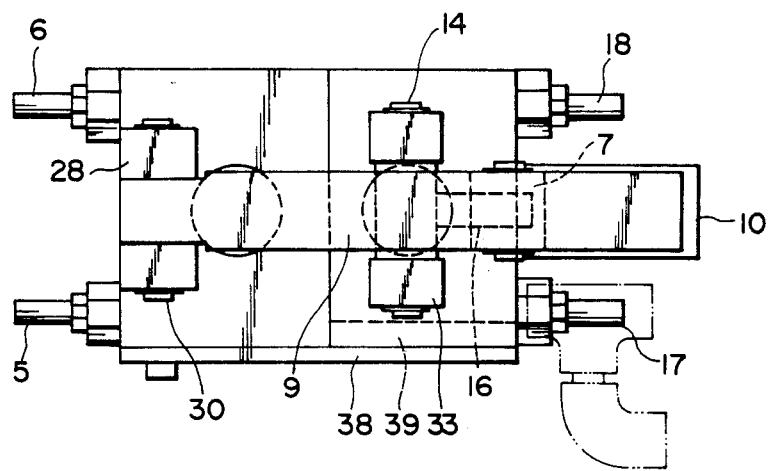
FIG. 2 is a side view illustrating the embodiment of FIG. 1.
Figure 3:
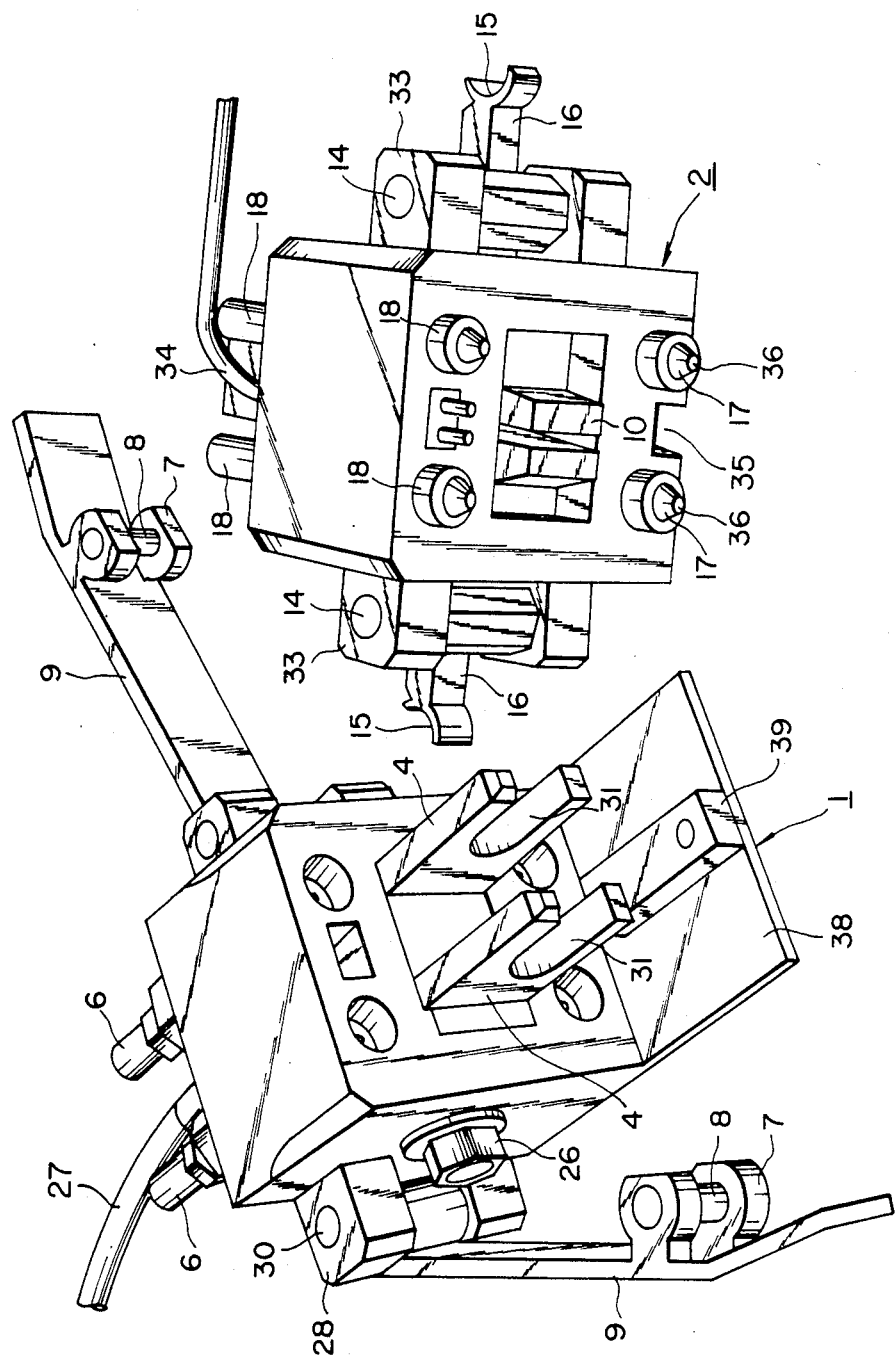
FIG. 3 is a perspective view illustrating metal fittings before connection therebetween.
Figure 4:
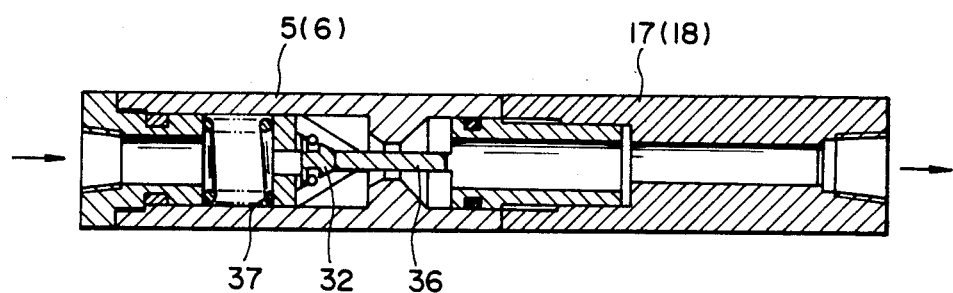
FIG. 4 is a cross-sectional view illustrating an air supply line or a cooling water line.
Figure 5:
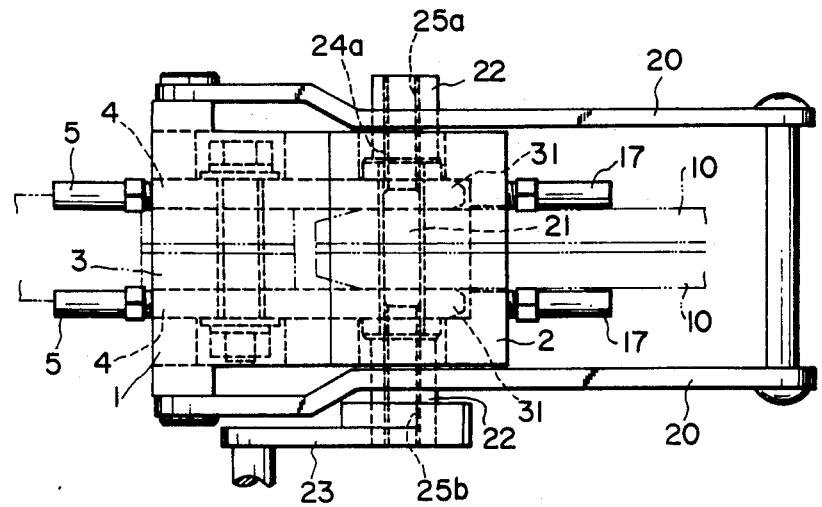
FIG. 5 is a plan view illustrating prior connecting metal fittings.
Figure 6:
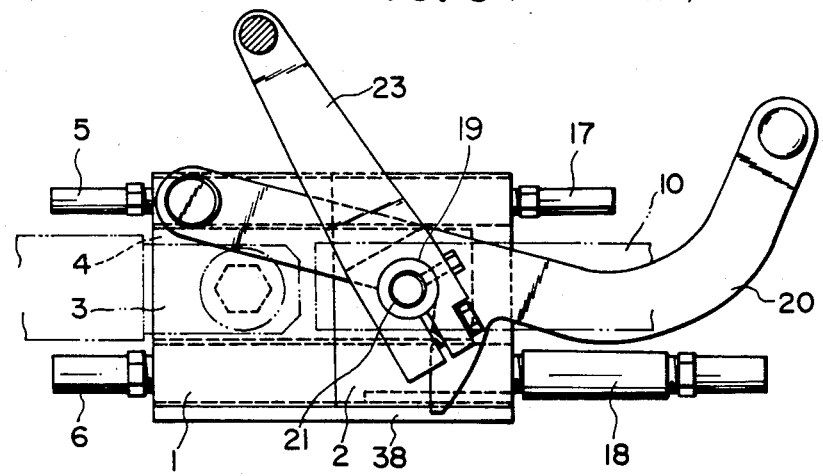
FIG. 6 is a side view illustrating the connecting metal fittings of FIG. 5.

The receiver metal fittings 1 and the clamping metal fittings 2 are respectively formed in rectangular casings. The receiver metal fittings 1 include the terminal plates 3, 3 on the transformer side and the power supply connecting strips 4, 4 disposed outside them, these members being fixed on the central portion of the metal fittings by a clamping bolt 26. In addition, the metal fittings 1 include the first air supply lines 6, 6 disposed on the upper both sides thereof and connected to the supply side air supply circulating line, a cabtire cable (namely a coated cable for delivering an ON-OFF signal to a welder) 27 disposed on the center thereof, and the first cooling water lines 5, 5 disposed on the lower sides and connected to the supply side water supply circulating line. Bosses 28, 28 formed on both sides of the metal fittings 1 include shafts 30, 30 provided thereon and having a substantially cylindrical cam 29 fitted thereto, the cam having the handles 9, 9 fixed thereon, and the stopping pins 8, 8 and the stopping cylinders 7, 7 provided in the vicinity of the tips of the handles 9, 9. The tips of the power supply connecting strips 4, 4 project from the receiver metal fitings 1 and include notched grooves 31, 31 formed in the axial direction thereof, and the shaft lever 11 described later is made movable in the notched grooves. Moreover, a connecting means is provided on the tip of the cabtire cable 27 to form a female part. On-off valves 32 are provided on the respective tips of the cooling water lines 5, 5 and the first air supply lines 6, 6 as shown in FIG. 4.

The clamping metal fittings 2 include the terminal plates 10, 10 penetrated by the shaft lever 11 and diposed on the welding gun side at the central portion thereof. The shaft lever 11 extends to both sides of the power supply connecting strips 4, 4 such that the lever is inserted into the notched grooves 31, 31 in the tips of the foregoing connecting strips when both the metal fittings 1, 2 come close to each other. The spring sockets 12, 12 are slidably fitted to the both ends of the shaft, and the plate springs 13, 13 are disposed on respective insides of the spring sockets 12, 12. The bosses 33, 33 are formed on both sides of the clamping metal fittings 2, and adapted to include the cam shafts 14, 14 provided thereon. The cam of the cam shaft is adapted to make contact with the spring sockets 12, 12 and include the stopping levers 16, 16 fixed thereon having the stopping hooks 15, 15 provided on the tips thereof. The clamping metal fittings 2 include the second air supply lines 18, 18 provided on the upper both sides thereof and connected to the welding gun side air supply circulating line and a cabtire cable 34 provided on the center thereof. In addition, the clamping metal fittings 2 further include the second cooling water lines 17, 17 provided on the lower both sides thereof and connected to the welding gun side water supply circulating line and a guide groove 35 provided therein. A connecting means is provided on the tip of the cabtire cable 34 to form a male part. Open projecting pieces 36 are provided on the tips of the second cooling water lines 17, 17 and the second air supply lines 18, 18 as shown in FIG. 4.

When the guide groove 35 formed in the clamping metal fittings 2 is inserted into a guide 39 provided on a connecting strip 38 of the receiver metal fittings 1 and both the metal fittings 1, 2 are forced to approach to each other, the neighborhoods of both end parts of the shaft lever 11 of the clamping metal fittings 2 are inserted into the notched grooves 31, 31 formed in the tips of the power supply connecting plates 4, 4 fixed on the receiver metal fittings 1, and thereby each of the plate springs 13, 13 is disposed between the spring socket and the power supply connecting strip. Upon simultaneous inward rotations of both the clamping handles 9, 9, the clamping and receiver metal fittings 2, 1 are closely connected as well as the power supply connecting strip 4, 4 and the terminal plates 10, 10 on the welding gun side connected, as described before. Hereupon, a current is made possible to be conducted through the cabtire cable by inserting the male part of the connecting means on the tip of the cabtire cable 34 into the female part of the connecting means on the tip of the cabtire cable 27. In addition, the open projecting pieces 36 provided on the respective tips of the second air supply lines 18, 18 and the second cooling water lines 17, 17 provided through the clamping metal fittings 2 open the on-off valves 32 provided on the respective tips of the first air supply lines 6, 6 and the first cooling water lines 5, 5 disposed through the receiver metal fittings 1 resisting the spring 37 force, so that the respective air supply lines and cooling water lines are also simultaneously opened.

Further, simultaneous outward rotations of the clamping handles 9, 9 cause, as shown before, press force of the clamping metal fittings 2 to the receiver metal fittings 1 to be removed, and clamping force caused by the power supply connecting strips 4, 4 to the terminal plates 10, 10 on the welding gun side to be also removed, so that both the metal fittings 1, 2 are made possible to be separated. With both the metal fittings 1, 2 so separated, press force by the open projecting piece 36 to the on-off valve 32 is also removed, whereby the on-off valve 32 is closed by the spring 37, so that air and water supplied to the respective air supply line and cooling water line on the welding gun side are interrupted and the engagement between the male and female of the connecting means of the cabtire cables are also released, thus interrupting the current conducted to the cabtire cables.

With the arrangement of the connecting metal fittings according to the present invention, only simultaneous inward rotations of a pair of clamping handles enable the receiver metal fittings and the clamping metal fittings to be connected with each other as well as the power supply connecting strip and the terminal plate to be connected with each other. In addition, only simultaneous outward rotations of the clamping handles enable the receiver metal fittings and the clamping metal fittings to be separated from each other. Accordingly, operation of the connecting metal fittings can be very simplified in comparison with prior ones. Moreover, the power supply connecting strip and the terminal plate can be simultaneously connected without fail unlike prior ones, so that a welder can be normally operated at all times without the possibility of heat generation, etc. In addition, both the metal fittings are adapted to include water and air supply systems therein, so that water and air can be simultaneously supplied and interrupted.

What is claimed is:

1. Connecting metal fittings for a resistance welder of the kind having one side including a transformer and another side including a resistance welding gun, the welder being of the kind having a water supply circulating line and an air supply circulating line, each line having a supply side and a side associated with the welding gun, the fittings comprising:

receiver metal fittings connected to the transformer side of the welder, clamping metal fittings connected to the resistance welding gun side of the welder, said receiver metal fittings including:

a pair of power supply connecting strips connected to terminal plates on the transformer side of the welder, said strips having respective notched grooves, a pair of first cooling water lines connected to the supply side of the water supply circulating line of the welder, a pair of first air supply lines connected to the supply side of the air supply circulating line of the welder, and a pair of rotatable clamping handles having stopping cylinders and stopping pins provided on a handle lever thereof, said clamping metal fittings including:

a shaft lever penetrating terminal plates on the welding gun side of the welder, said shaft lever being capable of penetrating said notched grooves in said power supply connecting strips of said receiver metal fittings, a pair of plate springs respectively disposed inside spring sockets slidably provided on both ends of said shaft lever, a pair of stopping levers fixed on cams of cam shafts provided outside said respective spring sockets and having stopping hooks provided on the tips of the cams, a pair of second cooling water lines connected to the welding gun side of the water supply circulating line, and a pair of second air supply lines connected to the welding gun side of the air supply circulating line.

2. Connecting metal fittings according to claim 1, including a pair of cables, one of said cables being provided through the receiver metal fittings while the other of said cables is provided through the clamping metal fittings.

* * * * *